US008857560B1

(12) United States Patent
Liao

(10) Patent No.: US 8,857,560 B1
(45) Date of Patent: Oct. 14, 2014

(54) VIBRATION-PROOF SOUND BOX AND ENGAGEMENT STRUCTURE OF THE SAME

(71) Applicants: Lite-On Electronics (Guangzhou) Limited, Guangzhou (CN); Lite-On Technology Corporation, Taipei (TW)

(72) Inventor: Jui-Chi Liao, New Taipei (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 13/935,127

(22) Filed: Jul. 3, 2013

(30) Foreign Application Priority Data

Apr. 22, 2013 (CN) ...................... 2013 2 0205769 U

(51) Int. Cl.

| | |
|---|---|
| ***A47B 81/06*** | (2006.01) |
| ***F16F 15/04*** | (2006.01) |
| ***F16F 15/08*** | (2006.01) |
| ***G10K 11/00*** | (2006.01) |
| *A47B 81/00* | (2006.01) |
| *F16F 15/00* | (2006.01) |
| *F16F 15/02* | (2006.01) |

(52) U.S. Cl.
CPC .................................... *G10K 11/002* (2013.01)
USPC ............ 181/199; 181/209; 248/634; 248/638

(58) Field of Classification Search
USPC ................. 181/199, 150, 149, 148, 207, 209; 381/354, 391, 392, 395, 389; 248/635, 248/634, 638; 411/353, 903, 999
See application file for complete search history.

(56) References Cited

U.S. PATENT DOCUMENTS

| | | | | |
|---|---|---|---|---|
| 3,814,357 | A * | 6/1974 | Rontgen | 248/573 |
| 5,322,979 | A * | 6/1994 | Cassity et al. | 181/150 |
| 5,799,930 | A * | 9/1998 | Willett | 267/141.4 |
| 6,307,748 | B1 * | 10/2001 | Lin et al. | 361/704 |
| 6,697,256 | B1 * | 2/2004 | Horng et al. | 361/704 |
| 6,760,460 | B1 * | 7/2004 | Jeon | 381/388 |
| 6,786,691 | B2 * | 9/2004 | Alden, III | 411/371.2 |
| 6,990,212 | B2 * | 1/2006 | Kambe | 381/386 |
| 7,073,624 | B2 * | 7/2006 | Decanio et al. | 181/150 |
| 7,283,368 | B2 * | 10/2007 | Wung et al. | 361/719 |
| 7,616,775 | B2 * | 11/2009 | Chang | 381/391 |
| 7,639,502 | B2 * | 12/2009 | Hu et al. | 361/710 |
| 7,701,699 | B2 * | 4/2010 | Ma | 361/679.21 |
| 7,965,496 | B2 * | 6/2011 | Li et al. | 361/679.01 |

(Continued)

FOREIGN PATENT DOCUMENTS

| | | | | |
|---|---|---|---|---|
| JP | 09078650 A | * | 3/1997 | E03C 1/20 |

*Primary Examiner* — Edgardo San Martin
(74) *Attorney, Agent, or Firm* — Li & Cai Intellectual Property (USA) Office

(57) ABSTRACT

A vibration-proof sound box includes a sound box, a first board unit, a speaker, a second board unit, and an engagement structure having a clasp, a holder and a vibration-absorption unit. The clasp has a base portion connected to the first board unit, two clasping arms extending from the base portion, and a clasping space formed between the clasping arms. The free end of each of the clasping arms is formed with a protruding clasping piece. The holder has an accommodating portion connected to the second board unit, and two clasping holes passing through the accommodating portion. The two clasping pieces respectively engage the two clasping holes. The vibration-absorption unit has a main body snugly disposed in the clasping space, and two extension portions extending from the main body. The two extension portions abut the inner wall of the holder.

18 Claims, 8 Drawing Sheets

(56) References Cited

U.S. PATENT DOCUMENTS 8,596,411 B2 * 12/2013 Liang et al. .................. 181/199
2001/0028724 A1 * 10/2001 Kowaki et al. ................ 381/349
2013/0206499 A1 * 8/2013 Maruyama et al. ........... 181/207
2014/0014434 A1 * 1/2014 Chen et al. .................... 181/199

* cited by examiner

VIBRATION-PROOF SOUND BOX AND ENGAGEMENT STRUCTURE OF THE SAME

BACKGROUND OF THE INVENTION

1. Field of the Invention

The present disclosure relates to a vibration-proof sound box and an engagement structure of the same; in particular, to a vibration-proof sound box for speakers and an engagement structure for engaging two boards of the sound box.

2. Description of Related Art

Conventional coupling methods for two boards employ screws for fixtures. However coupling by screw consumes labor and time. Additionally, specific factors for coupling between two boards need to be considered in particular fields, e.g. the speaker quality when applied on a speaker.

The Screw-free Speaker Device according to TW Patent M272341 provides a speaker device which can be assembled without screws. However the above technical feature assembles the face cover onto the sound-box main body by clasping and is unable to avoid transmitting vibration from the speaker to the face cover. The vibration can cause noise and affect the sound quality.

SUMMARY OF THE INVENTION

The object of the present disclosure is to provide a vibration-proof sound box having an engagement structure between two boards which allows the two boards to be assembled quickly and provides vibration-proof and retaining functions.

In order to achieve the abovementioned objects, the vibration-proof sound box of the present disclosure includes a first board, a second board facing and proximal to the first board, a speaker installed in either the first board or the second board, a sound box on one side of the speaker, and at least one engagement structure. Each of the engagement structures includes a clasp, a holder, and a vibration-absorption unit. The clasp has a base portion connected to the first board, a pair of clasping arms extending from the base portion away from the first board, and a clasping space formed between the clasping arms and extending into the base portion. The free end of each clasping arm is formed with a protruding clasping piece. The holder has an accommodating portion which is hollow and connected to the second board, and a pair of clasping holes passing through the accommodating portion. The two clasping pieces respectively engage with the two clasping holes. The vibration-absorption unit is made of vibration-absorbing material, has a main body snugly disposed in the clasping space of the clasp, and has a pair of extension portions protruding from the main body. The extension portions abut the inner wall of the holder.

The present disclosure further provides an engagement structure which can be disposed between the two boards to allow the two boards to be assembled quickly and provide vibration-proof and retaining functions.

In order to achieve the abovementioned objects, the engagement structure of the present disclosure is used to engage the first board with the second board, and has a clasp, a holder, and a vibration-absorption unit. The clasp has a base portion connected to the first board, a pair of clasping arms extending from the base portion away from the first board, and a clasping space formed between the clasping arms and extending into the base portion. The free end of each clasping arm is formed with a protruding clasping piece. The holder has an accommodating portion which is hollow and connected to the second board, and a pair of clasping holes passing through the accommodating portion. The two clasping pieces respectively engage with the two clasping holes. The vibration-absorption unit is made of vibration-absorbing material, has a main body snugly disposed in the clasping space of the clasp, and has a pair of extension portions protruding from the main body. The extension portions abut the inner wall of the holder.

The engagement structure of the present disclosure is disposed on the vibration-proof sound box, and the vibration-absorption unit assembles with the clasp to form an elastic body. When assembled to the holder, the clasping arms of the clasp engage outwardly with the clasping holes of the holder. The integrated assembly is very stable, firmly retained, and vibration-proof.

In order to further the understanding regarding the present disclosure, the following embodiments are provided along with illustrations to facilitate the disclosure of the present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

First Embodiment

Figure 1:
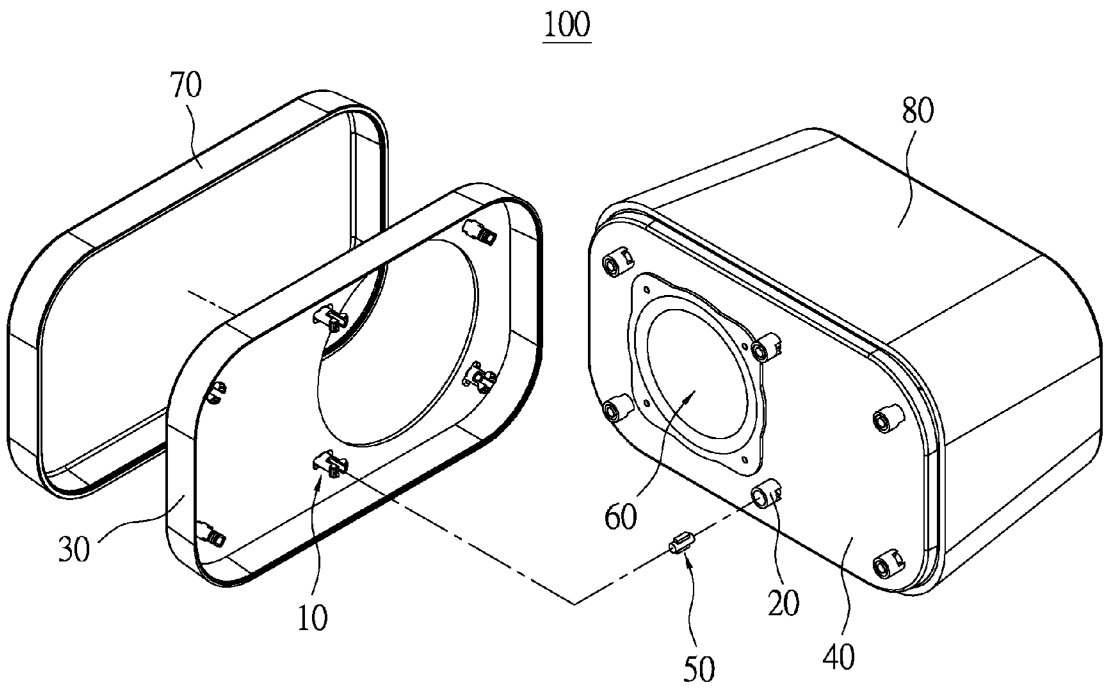
FIG. 1 shows a perspective exploded diagram of a vibration-proof sound box according to the present disclosure.
Figure 2:
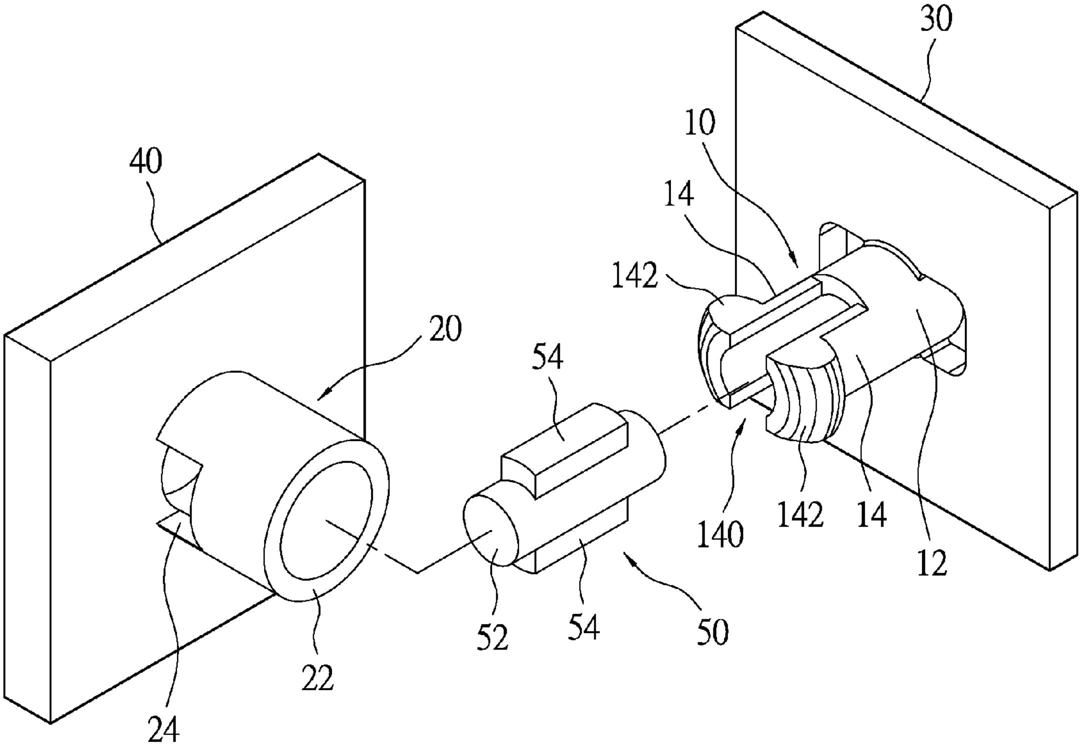
FIG. 2 shows a perspective exploded diagram of an engagement structure according to a first embodiment of the present disclosure.

FIG. 1 and FIG. 2 are respectively a perspective exploded diagram and a partial enlarged diagram of a vibration-proof sound box according to the present disclosure. The vibration-proof sound box 100 of the present disclosure includes a sound box 80, an inner board unit (labeled by 40) fixed to the sound box 80, a speaker 60 installed at the inner board unit, an outer board unit (labeled as 30) disposed at the outer side of the inner board unit, and a mesh 70 covering the outer board unit. The sound box 80 is positioned at one side of the speaker 60. The mesh 70 is positioned at the other side of the speaker 60. The engagement structure is disposed between the inner board unit and the outer board unit to allow the two boards to be assembled quickly without altering their relative positions, stabilize the sound box structure, and provide vibration-proof and retaining functions.

The engagement structure of the present disclosure not only can be applied on sound boxes (vibration-proof sound boxes), but can also be applied on any two units to be firmly assembled together, such as household acoustic electronics, products inside cars, and particularly products which produces vibrations. More specifically, the outer board unit can be considered as the first board unit 30, and the inner board unit can be considered as the second board unit 40. The second board unit 40 faces and is proximal to the first board unit 30. The engagement structure of the present disclosure can engage the first board unit 30 to the second board unit 40.

The engagement structure of the present disclosure includes a clasp 10, a holder 20, and a vibration-absorption unit 50. The vibration-absorption unit 50 is inserted into the clasp 10 and grasped tightly by the clasp 10. The clasp 10 is inserted into and clasps the holder 20. The vibration-absorption unit 50 abuts the clasp 10 and the holder 20 for absorbing vibration between the two.

The clasp 10 can be made of plastic or metal, and has a base portion 12 connected to the first board unit 30, a pair of clasping arms 14 extending from the base portion 12 away from the first board unit 30, and a clasping space 140 formed between the clasping arms 14 and extending into the base portion 12. The free end of each clasping arm 14 is formed with a protruding clasping piece 142. The clasping piece 142 of the present embodiment has an arc-shaped surface to facilitate assembly into the holder 20.

In the present embodiment, the base portion 12 of the clasp 10 is cylindrical. However, the base portion 12 can also be of other shapes, such as a square prism. The clasping arms 14 have a definite elasticity and grasping ability, can grasp the shock-absorption unit 50 and be fixed in the clasp 10. The quantity of clasping arms 14 is preferably two, or a plural number.

The holder 20 has an accommodating portion 22 which is hollow and connected to the second board unit 40, and a pair of clasping holes 24 passing through the accommodating portion 22. In the present embodiment, the two clasping holes 24 are correspondingly positioned at the bottom of the accommodating portion 22, and are adjacent to the second board unit 40. After assembly the engagement structure, the clasping pieces 142 are respectively wedged in the clasping holes 24. The quantity of clasping holes is preferably two, and corresponds to the quantity of clasping arms 14. In the present embodiment, the holder 20 is cylindrical. The outer diameter of the base portion 12 of the clasp 10 is substantially equal to the inner diameter of the holder 20. Namely, the base portion 12 abuts the inner wall of the holder 20.

The vibration-absorption unit 50 is made of vibration-absorbing material such as rubber, and forms an elastic body. The vibration-absorption unit 50 has a main body 52 snugly disposed in the clasping space 140 of the clasp 10, and a pair of extension portions 54 protruding from the main body 52. In the present embodiment, the length of the main body 52 of the vibration-absorption unit 50 is larger than the length of the extension portions 54 of the same. When the vibration-absorption unit 50 is assembled with the clasp 10, the main body 52 protrudes from the clasp 10.

Figure 3:
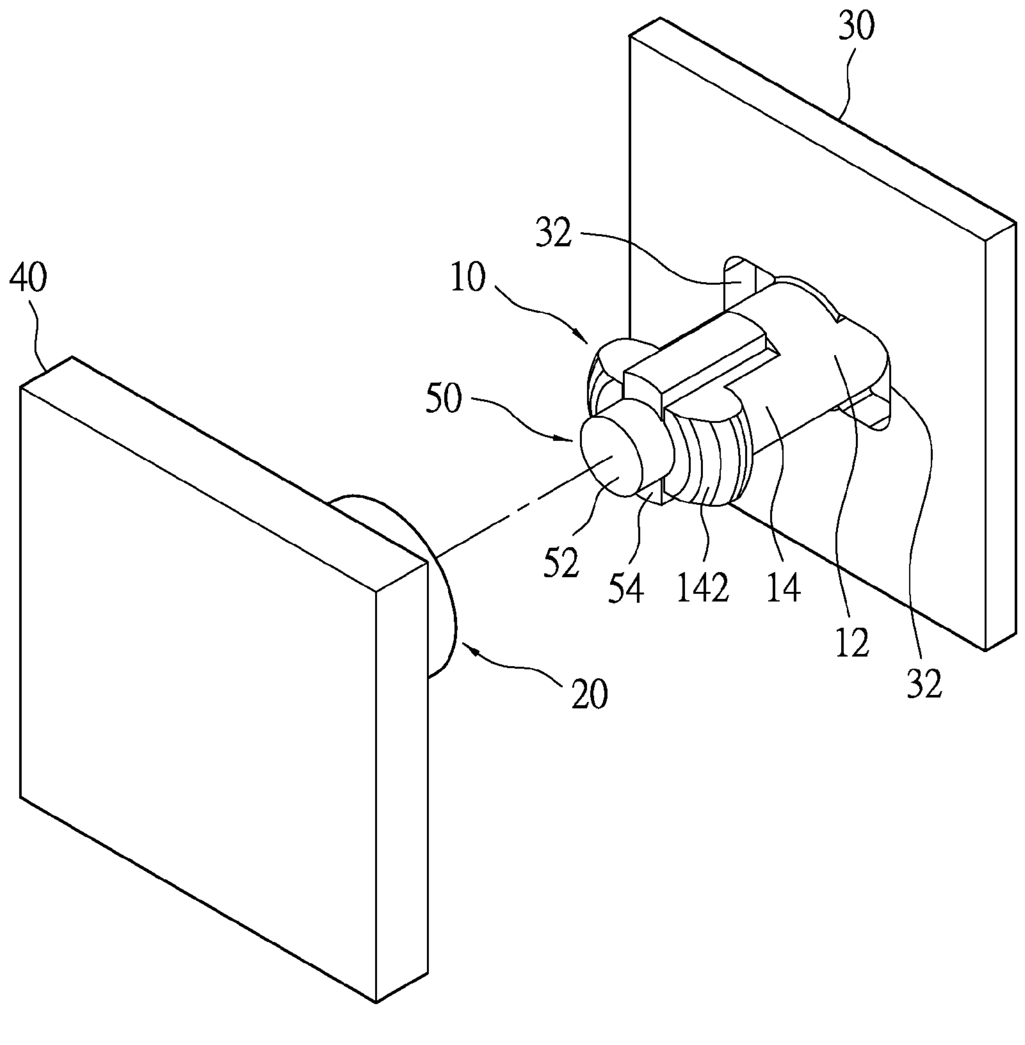
FIG. 3 shows a partially assembled diagram of an engagement structure according to the present disclosure.

As shown in FIG. 3, the vibration-absorption unit 50 of the present disclosure is inserted into the clasping space 140 of the clasp 10. The outer diameter of the extension portions 54 is substantially equal to the diameter of the base portion 12 and also equal to the inner diameter of the holder 20. The length of the extension portions 54 is substantially equal to the length of the clasping arms 14. When the extension portions 54 are grasped by the clasping arms 14, the vibration-absorption unit 50 does not rotate in the clasp 10. Additionally, the extension portions 54 abut the inner wall of the holder 20, thereby absorbing vibration of the main body 52 in the radial direction. Moreover, one end of each of the extension portions 54 abuts the outer edge of the base portion 12 proximal to the clasping arm 14.

Figure 4:
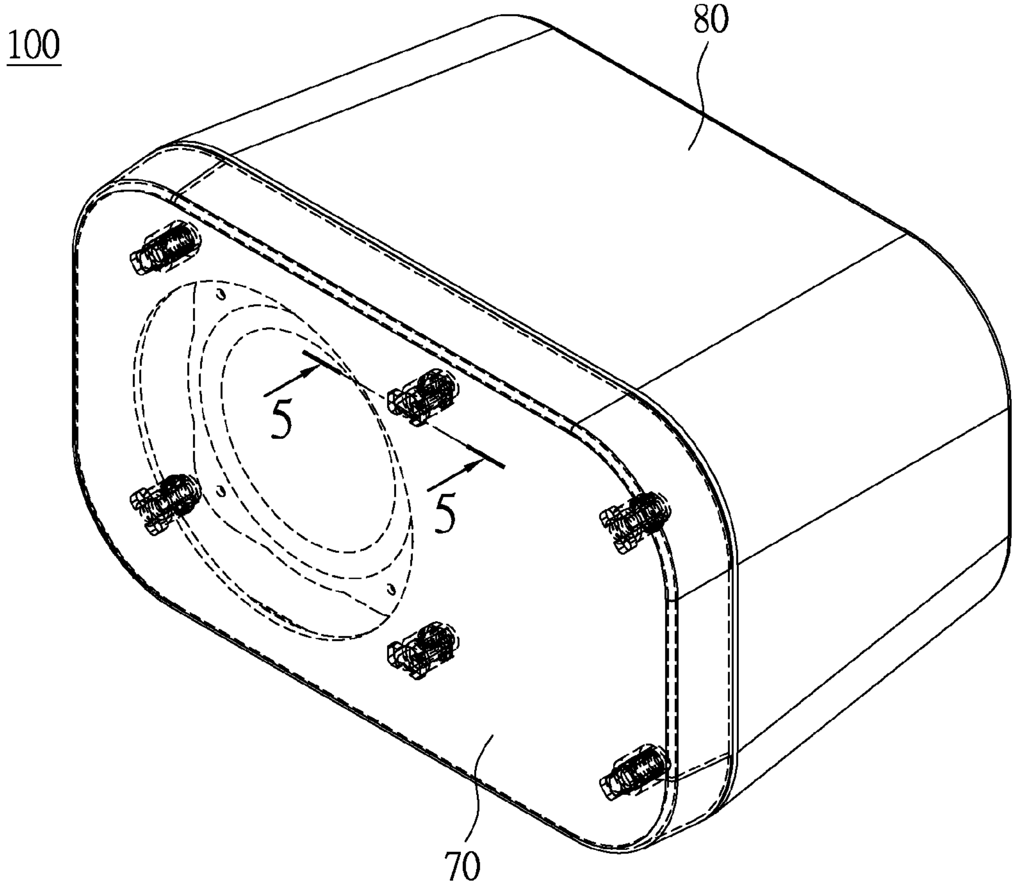
FIG. 4 shows a perspective schematic diagram of a vibration-proof sound box according to the present disclosure.
Figure 5:
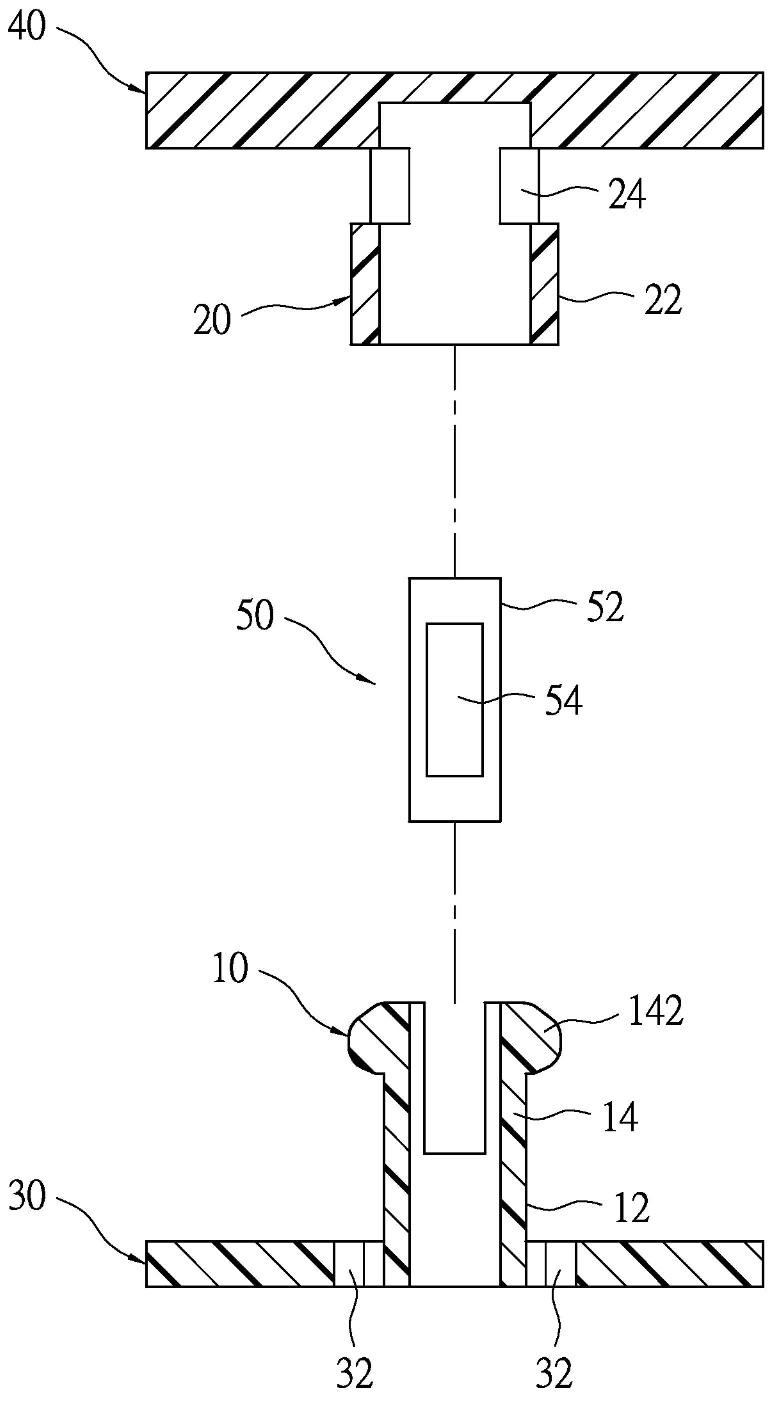
FIG. 5 shows a cross-sectional exploded diagram of an engagement structure according to the present disclosure.
Figure 6:
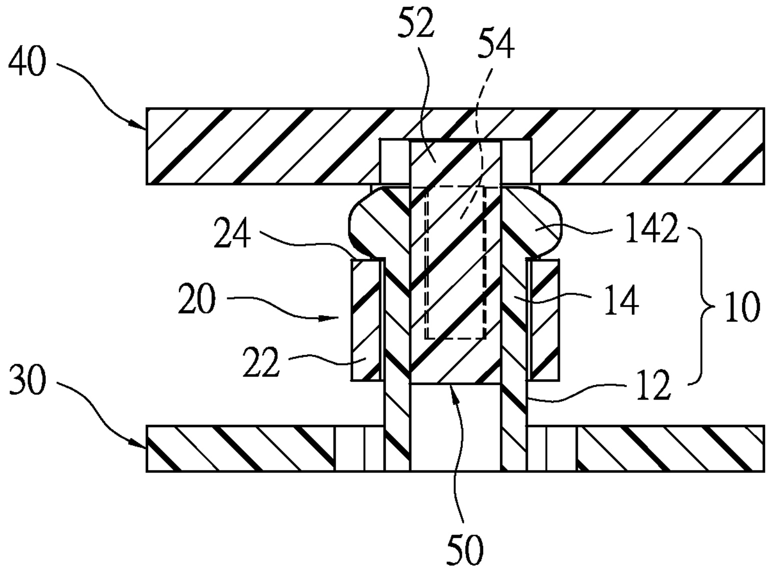
FIG. 6 shows a cross-sectional diagram of an assembled engagement structure according to the present disclosure.

Please refer to FIG. 4 to FIG. 6. FIG. 4 is a schematic diagram of an assembled vibration-proof sound box according to the present disclosure. FIG. 5 is a cross-sectional exploded diagram along the cut line shown in FIG. 4. FIG. 6 is a cross-sectional diagram of an assembled engagement structure. As shown in FIG. 6, following FIG. 3, the clasp 10 assembled with the vibration-absorption unit 50 is inserted into the holder 20. During assembly, given that the vibration-absorption unit 50 is elastic, the clasping arms 14 can be slightly compressed inward by the inner wall of the holder 20. After assembly, the clasping pieces 142 are respectively engaged with the clasping holes 24. Additionally, the main body 52 of the vibration-absorption unit 50 has one distal end protruded outside the clasp 10, which abuts the second board unit 40. By this configuration, the main body 52 of the vibration-absorption unit 50 can absorb vibration along the axial direction of the main body 52. Specifically, when the present embodiment is applied on a sound box, the second board unit 40 is an inner board and has a speaker 60 disposed within (refer to FIG. 1), and the vibration-absorption unit 50 directly abuts the second board unit 40 for preferable sound-absorption effect. Therefore, the vibration-absorption unit 50 of the present embodiment can absorb vibration along directions perpendicular or parallel to the first board unit 30 and the second board unit 40.

In the present embodiment, with respect to the sound box, the clasp 10 is integrally formed as one body with the first board unit 30, preferably by plastic injection molding. In other words, the plurality of clasps 10 and the first board unit 30 (outer board) can be formed by plastic injection molding. In accordance with the plastic injection molding technique, the first board unit 30 of the present embodiment is formed with a pair of mold holes 32 (as shown in FIG. 3 and FIG. 5) positioned at two sides of the base portion 12 corresponding to the clasping pieces 142 of the two clasping arms 14. The mold holes 32 serve to facilitate the first board unit 30 to be removed from the mold after plastic injection molding.

Second Embodiment

Figure 7:
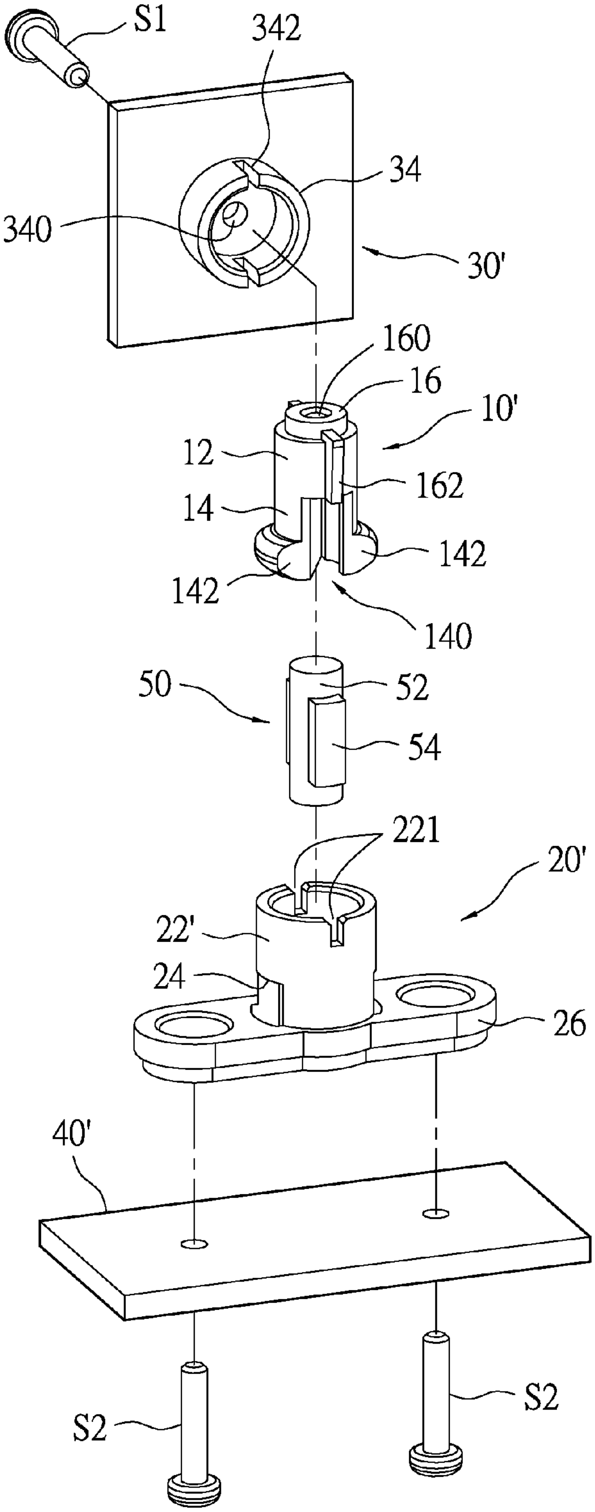
FIG. 7 shows a perspective exploded diagram of an engagement structure according to a second embodiment of the present disclosure.
Figure 8:
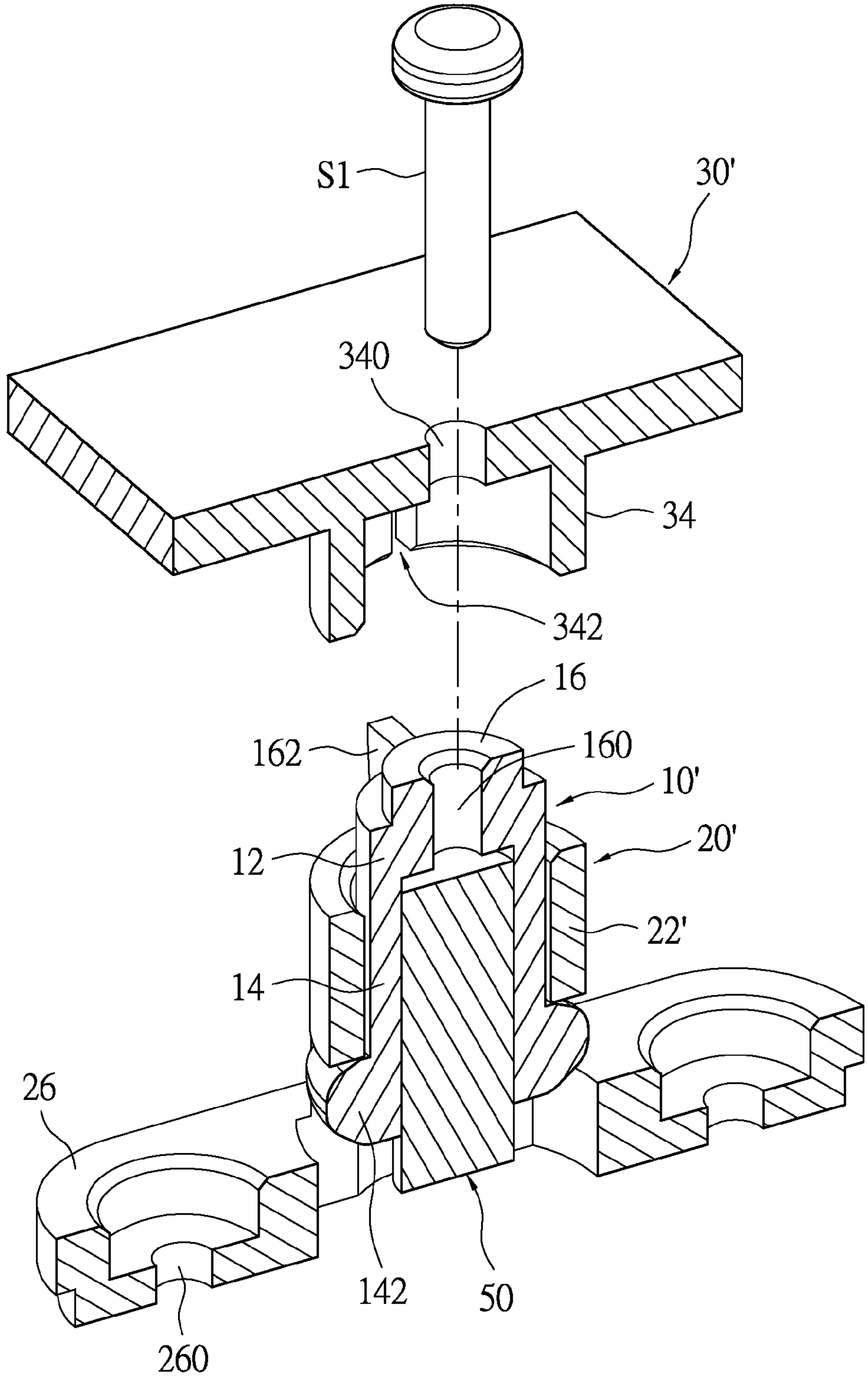
FIG. 8 shows a partially assembled engagement structure according to a second embodiment of the present disclosure.

FIG. 7 and FIG. 8 are perspective exploded diagrams of an engagement structure according to a second embodiment of the present disclosure. The present embodiment demonstrates that the engagement structure of the present disclosure can be independently disposed between any two boards. The clasp 10' of the present embodiment is locked onto the first board unit 30' by a screw S1. The screw S1 locks the clasp 10' perpendicular to the first board unit 30' along the axial direction of the clasp 10'.

In the present embodiment, the clasp 10' has a locking portion 16, and a pair of fixture portions 162 formed at the periphery of the locking portion 16 and extending to the base portion 12. The locking portion 16 is formed with a screw hole 160. The first board unit 30' has a sleeve portion 34 for accommodating the locking portion 16. The sleeve portion 34 is formed with a pair of fixture grooves 342, and a screw hole 340. The fixture grooves 342 correspond to the fixture portions 162. By this configuration, the screw S1 locks the locking portion 16 to the first board unit 30'. When assembling the present embodiment, the fixture portions 162 are engaged with the fixture grooves 342 to prevent the clasp 10' from rotating its axis. This design is easy to assemble and does not create translational or rotational motion. The quantity of the fixture portions 162 and the fixture groove 342 can be plural or at least one.

The holder 20' of the present embodiment is locked to the second board unit 40' by two screws S2. The two screws S2 are disposed on two sides of the holder 20' for providing the middle of the holder 20' with space for passing through. By this configuration, when the clasp 10' and the vibration-absorption unit 50 are disposed at the holder 20', the vibration-absorption unit 50 can directly abut the second board unit 40' to absorb the vibration created by sources of vibration at the second board unit 40'. The periphery of the accommodating portion 22' of the holder 20' is formed with a pair of supplemental fixture grooves 221. The two fixture portions 162 are inserted into the two supplemental fixture grooves 221. The positions of the two fixture portions 162 correspond to the part of the clasping space 140 between the clasping arms 14. The quantity and positions of the supplemental fixture grooves 221 correspond to those of the fixture portions 162, whose quantity can be plural or at least one. The holder 20' further has a pair of wing portions 26 extended from the bottom of the accommodating portion 22'. The screws S2 pass through screw holes 260 of the wing portions 26 to lock the holder 20' to the second board unit 40'.

The engagement structure of the present disclosure can be applied on a vibration-proof sound box. When the vibration-absorption unit 50 assembles with the clasp, they become an elastic body. When assembling with the holder, the clasping arms of the clasp elastically engage outwardly with the clasping holes of the holder. The integrated assembly is very stable, firmly retained, and vibration-proof. Specifically, when the engagement structure is applied on a sound box, the problem of sound box vibration is avoided. The engagement structure of the present disclosure is easy to assemble, and can be disposed between any two board units or components. Additionally, the engagement structure of the present disclosure can be disassembled.

The positions of the clasp and holder of the engagement structure of the present disclosure can be swapped. Namely, the clasp can be disposed on the inner board (the second board unit) and the holder can be disposed on the outer board (the first board).

The descriptions illustrated supra set forth simply the preferred embodiments of the present disclosure; however, the characteristics of the present disclosure are by no means restricted thereto. All changes, alternations, or modifications conveniently considered by those skilled in the art are deemed to be encompassed within the scope of the present disclosure delineated by the following claims.

What is claimed is:

1. A vibration-proof sound box, comprising:

a first board unit;

a second board unit, facing and proximal to the first board unit;

a speaker, installed in a unit selected from the group consisting of the first board unit and the second board unit;

a sound box, positioned at one side of the speaker;

a clasp having a base portion, two clasping arms and a clasping space, the base portion connected to the first board unit, the two clasping arms extending from the base portion away from the first board unit, the clasping space formed between the clasping arms and extending into the base portion, wherein the free end of each of the clasping arms is formed with a protruding clasping piece;

a holder having an accommodating portion and two clasping holes, the accommodating portion being hollow and connected to the second board unit, the two clasping holes passing through the accommodating portion, wherein the two clasping pieces are respectively engaged with the two clasping holes; and a vibration-absorption unit having a main body and two extension portions, the main body snugly disposed in the clasping space of the clasp, the two extension portions extending outward from the main body and abutting the inter wall of the holder.

2. The vibration-proof sound box according to claim 1, further comprising a mesh positioned on the other side of the speaker.

3. The vibration-proof sound box according to claim 1, wherein the base portion of the clasp is cylindrical, the holder is cylindrical, and the main body of the vibration-absorption unit is cylindrical.

4. The vibration-proof sound box according to claim 3, wherein the outer diameter of the two extension portions is substantially equal to the diameter of the base portion, and is substantially equal to the inner diameter of the holder, and the length of the extension portions is substantially equal to the length of the clasping arms.

5. The vibration-proof sound box according to claim 4, wherein the length of the main body of the vibration-absorption unit is larger than the length of the extension portions, and when the vibration-absorption unit is assembled to the clasp, one end of the main body protrudes from the clasp and abuts the second board unit.

6. The vibration-proof sound box according to claim 5, further comprising at least one speaker at the second board unit.

7. The vibration-proof sound box according to claim 1, wherein the two clasping holes are positioned at the bottom of the accommodating portion and are proximal to the second board unit.

8. The vibration-proof sound box according to claim 7, wherein the clasp is integrally connected to the first board unit as one body, the first board unit is formed with two mold holes positioned at two sides of the base portion, and the positions of the mold holes correspond to the two clasping pieces of the two clasping arms.

9. An engagement structure for engaging a first board unit to a second board unit, comprising:

a clasp having a base portion, two clasping arms and a clasping space, the base portion connected to the first board unit, the two clasping arms extending from the base portion away from the first board unit, and the clasping space formed between the clasping arms and extending into the base portion, wherein the free end of each of the clasping arms is formed with a protruding clasping piece;

a holder having an accommodating portion and two clasping holes, the accommodating portion being hollow and connected to the second board unit, the two clasping holes passing through the accommodating portion, wherein the two clasping pieces are respectively engaged with the two clasping holes; and a vibration-absorption unit having a main body and two extension portions, the main body snugly disposed in the clasping space of the clasp, and the two extension portions extending outward from the main body and abutting the inter wall of the holder.

10. The engagement structure according to claim 9, wherein the base portion of the clasp is cylindrical, the holder is cylindrical, and the main body of the vibration-absorption unit is cylindrical.

11. The engagement structure according to claim 10, wherein the outer diameter of the two extension portions is substantially equal to the diameter of the base portion, and is substantially equal to the inner diameter of the holder, and the length of the extension portions is substantially equal to the length of the clasping arms.

12. The engagement structure according to claim 11, wherein the length of the main body of the vibration-absorption unit is larger than the length of the extension portions, and when the vibration-absorption unit is assembled to the clasp, one end of the main body protrudes from the clasp and abuts the second board unit.

13. The engagement structure according to claim 9, wherein the two clasping holes are positioned at the bottom of the accommodating portion and are proximal to the second board unit.

14. The engagement structure according to claim 13, wherein the clasp is integrally connected to the first board unit as one body, the first board unit is formed with two mold holes positioned at two sides of the base portion, and the positions of the mold holes correspond to the two clasping pieces of the two clasping arms.

15. The engagement structure according to claim 13, wherein the clasp is locked to the first board unit by screwing, and the holder is locked to the second board unit by screwing.

16. The engagement structure according to claim 15, wherein the clasp has a locking portion, and at least fixture portion formed at the periphery of the locking portion and extending to the base portion, the locking portion is formed with a screw hole, the first board unit has a sleeve portion for accommodating the locking portion, the sleeve portion is formed with a screw hole and at least one fixture groove corresponding to the at least one fixture portion, and the clasp is locked to the first board unit by a screw screwed onto the locking portion.

17. The engagement structure according to claim 16, wherein the periphery of the accommodating portion of the holder is formed with at least one supplemental fixture groove, the at least one fixture portion is inserted into the at least one supplemental fixture groove, and the position of the at least one fixture portion corresponds to the clasping space between the two clasping arms.

18. The engagement structure according to claim 17, wherein the holder further has two wing portions extending from the bottom end of the accommodating portion, and the two wing portions are locked to the second board unit.

* * * * *